(12) United States Patent
Cho et al.

(10) Patent No.: US 9,920,675 B2
(45) Date of Patent: Mar. 20, 2018

(54) EXHAUST PURIFICATION APPARATUS FOR VEHICLE AND METHOD OF CONTROLLING THE SAME

(71) Applicant: Hyundai Motor Company, Seoul (KR)

(72) Inventors: Hyo Sang Cho, Suwon-si (KR); Jung Sub Lee, Yongin-si (KR); Seung Eun Yu, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/230,549

(22) Filed: Aug. 8, 2016

(65) Prior Publication Data

US 2017/0292426 A1 Oct. 12, 2017

(30) Foreign Application Priority Data

Apr. 7, 2016 (KR) .................. 10-2016-0042822

(51) Int. Cl.
*F01N 3/00* (2006.01)
*F01N 3/10* (2006.01)
*F01N 3/20* (2006.01)

(52) U.S. Cl.
CPC .......... *F01N 3/208* (2013.01); *F01N 2560/06* (2013.01); *F01N 2560/07* (2013.01); *F01N 2610/02* (2013.01); *F01N 2900/1806* (2013.01)

(58) Field of Classification Search
CPC ...... F01N 3/2066; F01N 13/02; F01N 3/0842; F01N 2560/06; F01N 2560/07; F01N 3/208; F01N 2610/00–2610/03; F01N 2900/1806; F01N 2900/1818; F01N 2900/1821

USPC ................................................... 60/286, 303
See application file for complete search history.

(56) References Cited

U.S. PATENT DOCUMENTS 8,646,258 B2 * 2/2014 Vanvolsem ......... B01F 3/04049
60/286
2003/0019949 A1 * 1/2003 Solie .................... A01C 23/047
239/172

FOREIGN PATENT DOCUMENTS

| JP | 2012-530214 A | 11/2012 |
| JP | 5815959 B | 11/2015 |
| KR | 10-1996-0034710 | 10/1996 |
| KR | 10-2010-0015108 | 2/2010 |
| KR | 10-2012-0130603 | 12/2012 |

OTHER PUBLICATIONS

Office Action dated Apr. 25, 2017 in corresponding Korean Patent Application No. 10-2016-0042822, p. 5.

* cited by examiner

*Primary Examiner* — Phutthiwat Wongwian
*Assistant Examiner* — Diem Tran
(74) *Attorney, Agent, or Firm* — Brinks Gilson & Lione (57) ABSTRACT

The present disclosure relates to an exhaust purification apparatus and a method of controlling the apparatus. The exhaust purification apparatus includes: an injector for injecting urea solution into an exhaust pipe; a driving unit to provide driving force for adjusting an injection angle of the injector; and a control unit to determine the injection angle of the injector based on values of a spatial velocity, flow rate, pressure and temperature of exhaust gas and to drive the driving unit so as to control the injection angle of the injector. In particular, the injection angle of the injector is adjusted by pivotal movement of the injector.

11 Claims, 4 Drawing Sheets

EXHAUST PURIFICATION APPARATUS FOR VEHICLE AND METHOD OF CONTROLLING THE SAME

CROSS REFERENCE TO RELATED APPLICATION

The present application claims priority to and the benefit of Korean Patent Application No. 10-2016-0042822, filed on Apr. 7, 2016, which is incorporated herein by reference in its entirety.

FIELD

The present disclosure relates to an apparatus for purifying harmful substances in exhaust gas generated during vehicle running and a method of controlling the same.

BACKGROUND

The statements in this section merely provide background information related to the present disclosure and may not constitute prior art.

During vehicle running, exhaust gas emitted, resulting from combustion of fuel contains regulated emissions that are harmful to human body or can contaminate atmosphere, which are generated depending on conditions of vehicle running. Notable regulated emissions include carbon oxides, nitrogen oxides and the like.

In order to reduce emissions of these regulated materials, vehicles are equipped with a variety of exhaust purification devices or apparatuses, in particular, a selective catalytic reduction (SCR) device for removing nitrogen oxides (NOx) existing in exhaust gas.

The SCR device is a device for removing NOx substance by injecting urea solution into exhaust gas containing the NOx substance to form a mixture of urea solution and exhaust gas and allowing the mixture to be subjected to chemical reaction in the process of passing through a catalytic device to change into water and nitrogen.

Meanwhile, in case of such SCR device, as the more uniform a mixture ratio of the urea solution and the exhaust gas is, the more the performance of removing the NOx substance is enhanced, improving the performance of mixing the urea solution and the exhaust gas in the SCR device is an important task to enhance the performance of the exhaust purification device for reducing the NOx substance.

As the foregoing described as the background art is just to promote better understanding of the background of the present disclosure, it must not be taken as an admission that it corresponds to the prior art well known to those who have ordinary skill in the art.

SUMMARY

The present disclosure provides an exhaust purification apparatus that can effectively increase performance of mixing exhaust gas and urea solution for reducing NOx substance in the exhaust gas, and a method of controlling the apparatus.

An exhaust purification apparatus for a vehicle according to the present disclosure comprises: an injector for injecting urea solution into an exhaust pipe, which is arranged in such a manner that an injection angle is adjusted by pivotal movement of the injector; a driving unit arranged to provide driving force for adjusting the injection angle of the injector; and a control unit arranged to determine the injection angle of the injector based on values of at least one of spatial velocity, flow rate, pressure and temperature of exhaust gas and drive the driving unit so as to control the injection angle of the injector.

The exhaust purification apparatus may further comprises a sealing member arranged at a mounting portion for the injector in the exhaust pipe in a manner of being deformable by pivotal movement of the injector such that it seals the injector mounting portion while allowing the pivotal movement of the injector.

The sealing member may be arranged to enclose the mounting portion for the injector and at least partially the injector.

The control unit may determine the injection angle of the injector, based on an injection amount of the urea solution from the injector and the values of the at least one of the spatial velocity, flow rate, pressure and temperature of the exhaust gas as parameters.

The control unit is arranged to determine the injection angle of the injector, which matches with the current spatial velocity of the exhaust gas, through a data map in which values of at least one of spatial velocity, flow rate, pressure and temperature of the exhaust gas are binned and an injection angle of the injector for each of bins is predetermined and stored.

The control unit may determine the injection angle of the injector such that the injection angle of the injector decreases as the values of the at least one of the spatial velocity, flow rate, pressure and temperature of the exhaust gas increase.

The exhaust purification apparatus may further comprise a link member for transmitting driving force of the driving unit to the injector.

The driving unit is provided with a rotary arm carrying out a rotational displacement wherein the rotary arm may be arranged to be coupled to the link member to transmit driving force.

The exhaust purification apparatus may further comprise guide members in a shape of protrusion formed to limit a range of the pivotal movement of the injector.

In another aspect of the present disclosure, a method of controlling an exhaust purification apparatus for a vehicle comprises: a step of determining, by a control unit, an injection angle of an injector for injecting urea solution into an exhaust pipe based on values of at least one of spatial velocity, flow rate, pressure and temperature of exhaust gas; and a step of controlling, by the control unit, the injection angle of the injector. The control unit drives a driving unit and controls the injection angle of the injector such that the injection angle of the injector is adjusted to an injection angle determined at the step of determining the injection angle.

At the step of determining the injection angle, the control unit may determine the injection angle of the injector based on a urea solution injection amount of the injector and the values of the at least one of the spatial velocity, flow rate, pressure and temperature of the exhaust gas as parameters.

At the step of determining the injection angle, the control unit may determine the injection angle of the injector for the current spatial velocity of the exhaust gas through a data map in which values of at least one of spatial velocity, flow rate, pressure and temperature of the exhaust gas are binned and an injection angle of the injector for each of bins is predetermined and stored.

At the step of determining the injection angle, the control unit may control the injector such that the injection angle of the injector decreases as the values of the at least one of the spatial velocity, flow rate, pressure and temperature of the exhaust gas increase.

According to the exhaust purification apparatus and the method of controlling the same as mentioned above, it is possible to effectively enhance performance of mixing exhaust gas and urea solution for reducing NOx substance in the exhaust gas.

Specifically, the injection angle of the injector for injecting urea solution is controlled depending on values of at least one of spatial velocity, flow rate, pressure and temperature of the exhaust gas and thereby it is possible to effectively enhance performance of mixing urea solution that can be changed variously depending on the running condition.

In particular, it is possible to inhibit or prevent flow distance of the exhaust gas that is desired for mixing the urea solution from being increased particularly due to increase of the spatial velocity of the exhaust gas by controlling the urea solution injection angle to be decreased as the values of the at least one of spatial velocity, flow rate, pressure and temperature of the exhaust gas increase.

In another form, the injector is arranged to move pivotally in the exhaust pipe, and the sealing member is arranged at a coupling portion between the injector and the exhaust pipe so as to allow the injector to move pivotally. Therefore, pivotal movement of the injector can be made effectively while effectively inhibiting or preventing any leakage of the exhaust gas and the like that may be occurred at the coupling portion.

In addition, as the driving unit for providing driving force for moving the injector pivotally is provided with the rotary arm and the rotary arm is arranged to provide the driving force to the injector via the link member, it is possible to provide the driving force stably irrespective of the fact that a distance between the driving unit and the injector is variable due to the pivotal movement of the injector.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Further, in the description of the present disclosure, the detailed description of related well-known configurations and functions is not provided, when it is determined as unnecessarily making the scope of the present disclosure unclear.

Figure 1:
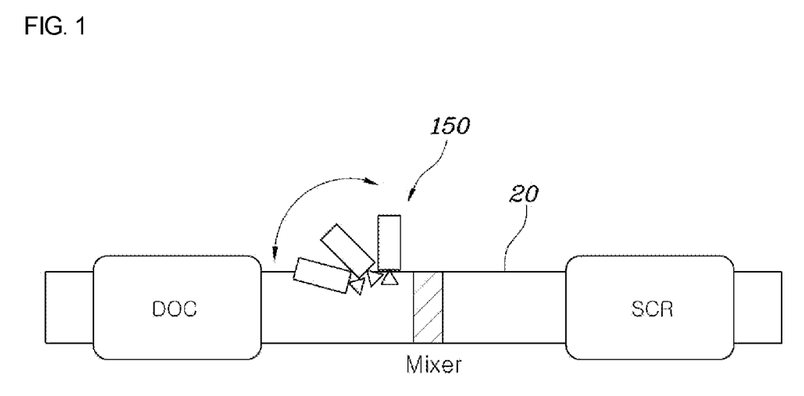
FIG. 1 is a schematic diagram showing a configuration that an exhaust purification apparatus for a vehicle is provided in a flow passage of exhaust gas.
Figure 2:
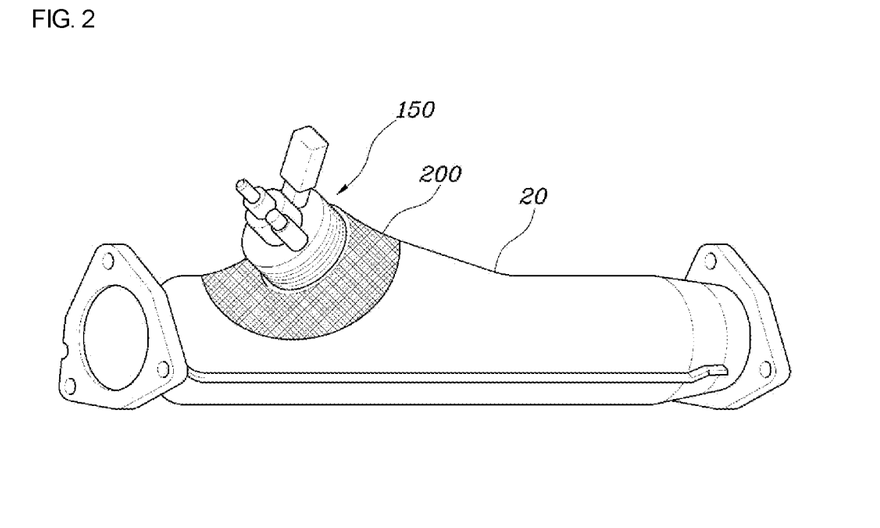
FIG. 2 is a diagram showing a configuration that a urea injector is provided in a flow passage of exhaust gas in an exhaust purification apparatus for a vehicle.
Figure 3:
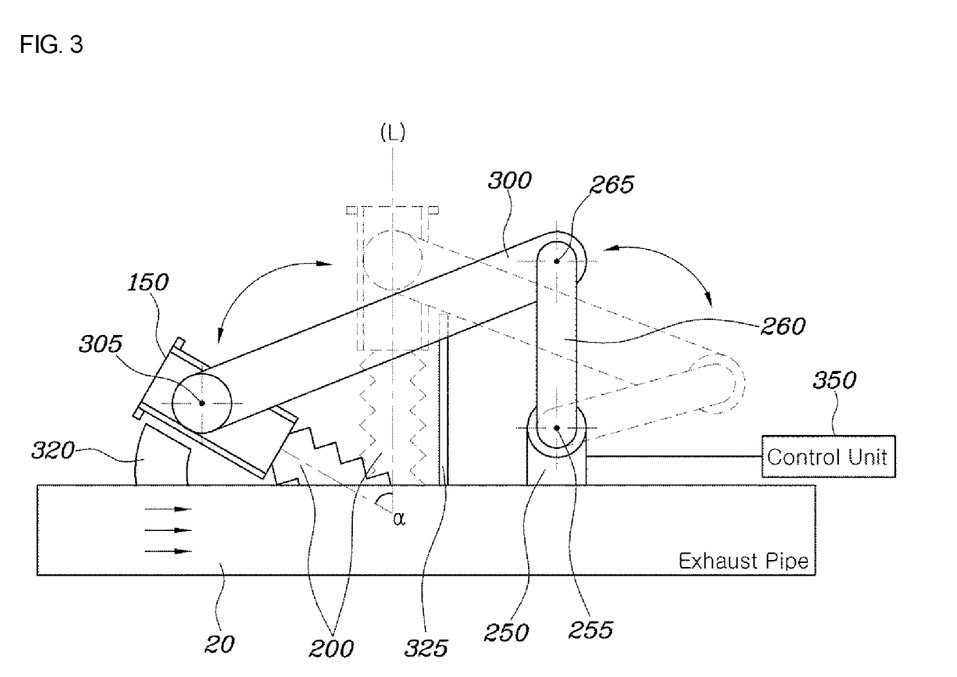
FIG. 3 is a diagram showing that a urea injector moves pivotally by a driving unit in an exhaust purification apparatus for a vehicle.

As shown in FIGS. 1 to 3, an exhaust purification apparatus for a vehicle according to the present disclosure comprises: an injector 150 for injecting urea solution into an exhaust pipe 20, which is arranged in such a manner that injection angle "α" is adjusted by pivotal movement of the injector 150; a driving unit 250 arranged to provide driving force for adjusting the injection angle "α" of the injector 150; and a control unit 350 arranged to determine the injection angle "α" of the injector 150 depending on spatial velocity of exhaust gas and drive the driving unit 250 to control the injection angle "α" of the injector 150.

Specifically, the injector 150 is arranged to inject urea solution into the exhaust pipe 20 in such a manner that the injection angle "α" is controlled by pivotal movement of the injector.

The injector 150 is arranged at a portion of the exhaust pipe 20 as shown in FIGS. 1 to 2 to inject urea solution for removing NOx substance contained in exhaust gas. In addition, the injector 150 is arranged upstream of a catalyst device for reducing action of mixture of urea solution and exhaust gas by a catalyst and inject the urea solution.

On the other hand, in order to facilitate mixing of the urea solution and the exhaust gas, the exhaust purification apparatus may be provided with a mixer. In this case, the injector 150 may be located upstream of the mixer as shown in FIG. 1.

In one form, the injector 150 may be arranged to direct toward downstream of flow of the exhaust gas so that it is possible to inhibit or prevent the urea solution injected by the injector 150 from moving back to the injector 150 due to influence of the flow of the exhaust gas and adhering to the injector 150. However, there is no doubt that the injector 150 may be arranged to direct toward upstream of the flow of the exhaust gas, if desired.

On the other hand, the injector 150 is arranged in the exhaust pipe 20 to move pivotally so that the injection angle "α" is controlled by the pivotal movement of the injector. To this end, the injector 150 is hinged to a point of the exhaust pipe 20 so as to facilitate pivotal movement thereof. FIG. 1 or 3 shows the status that the injector 150 arranged in the exhaust pipe 20 moves pivotally.

In one form, the injector 150 may be arranged at the upper end side of the exhaust pipe 20 to inject the urea solution toward downstream of the exhaust gas. In this form, the injector 150 is arranged to move pivotally about a central axis perpendicular to a flow direction of the exhaust gas. Therefore, the injector 150 moves pivotally to direct toward upstream or downstream of the exhaust gas, or the bottom surface of the exhaust pipe 20.

Meanwhile, the driving unit 250 is arranged to provide driving force for adjusting the injection angle "α" of the injector 150. FIG. 3 illustrates a driving unit 250 for supplying the injector 150 with driving force, which is arranged at a peripheral portion of the injector 150 that is an outer surface of the exhaust pipe 20.

This driving unit 250 may be provided in a variety of types such as pneumatic type, mechanical type and the like, and may be adapted to provide a variety of movements such as rotational or translational movement, etc. FIG. 3 illustrates one form of a driving unit 250 provided as a motor to be controlled by a control unit 350 and supply rotational force.

The control unit 350 is arranged to determine the injection angle "α" of the injector 150 based on values of spatial velocity, flow rate, pressure and temperature of the exhaust gas, and to drive the driving unit 250 so as to control the injection angle "α" of the injector 150.

The exhaust purification apparatus of the present disclosure is, in particular, an apparatus for removing NOx substance contained in the exhaust gas. The apparatus forms mixture of the urea solution injected by the injector 150 and the exhaust gas, and the mixture is subjected to chemical reaction during passing through a catalytic device and as a result, such NOx substance is removed.

The term "NOx substance" used in the present disclosure is collectively referred to unstable nitrogen oxides contained in exhaust gas of vehicles and includes typically nitrogen monoxide, nitrogen dioxide and the like. Such NOx substance will be converted into water and nitrogen through reaction with the urea solution and then discharged to the outside of the vehicle.

In the exhaust purification apparatus, as the urea solution injected from the injector 150 and the exhaust gas are mixed uniformly, chemical reaction amount of them by the catalyst becomes to be increased and thereby efficiency of removing NOx substance is enhanced. Therefore, more increased performance of mixing the urea solution and the exhaust gas is advantageous in the exhaust purification apparatus.

On the other hand, since spatial velocity, flow rate, pressure and temperature of the exhaust gas vary depending on the running condition of vehicles, performance of mixing the urea solution and the exhaust gas, which is produced within a limited distance between the injector 150 and the catalyst device, varies depending on, in particular, the spatial velocity of the exhaust gas.

For example, when the spatial velocity of the exhaust gas is increased, flow distance desired for the urea solution injected at the same injection angle "α" to be diffused throughout the entire exhaust gas is increased, whereas when the spatial velocity of the exhaust gas is decreased, flow distance desired for the urea solution injected at the same injection angle "α" to be diffused throughout the entire exhaust gas is decreased.

As such, under the condition that the injection angle "α" of the injector 150 is fixed, performance of mixing the urea solution and the exhaust gas, which is produced between the injector 150 and the catalyst device, is variable. Therefore, in this form of the present disclosure, the injection angle "α" of the injector 150 is controlled to be varied depending on the spatial velocity of the exhaust gas so that performance of mixing the urea solution and the exhaust gas is improved.

To this end, the control unit 350 is arranged to determine the injection angle "α" of the injector 150 capable of moving pivotally depending on spatial velocity of the exhaust gas and drive the driving unit 250 and move the injector 150 pivotally such that the injector 150 injects the urea solution at the injection angle "α" determined. Relationship between each of these components is schematically illustrated in FIG. 3.

One form of control of the spatial velocity of the exhaust gas and the injection angle "α" of the injector 150 is described below.

At first, the spatial velocity of the exhaust gas may be determined as follows:

$$SV = \frac{\frac{A \times G \times T}{P}}{V}$$

Where SV stands for space velocity of exhaust gas, G stands for flow rate of the exhaust gas, T stands for temperature of the exhaust gas, P stands for pressure of the exhaust gas, V stands for volume of mixture flowing in the exhaust pipe 20, and A is a constant derived experimentally or theoretically while the parameters as above are converted into velocity.

The control unit 350 may calculate the spatial velocity of the exhaust gas using the equation above and also get measured values of the spatial velocity of the exhaust gas using a sensor.

As described above, if the spatial velocity of the exhaust gas is increased, the degree to which urea solution diffuses into the exhaust gas within the same distance can be reduced. Therefore, in order that the urea solution is injected in a direction close to a radial direction of the exhaust pipe 20 and thereby the diffusing degree of the urea solution is increased, the injection angle "α" of the injector 150 is forced to decrease.

The injection angle "α" of the injector 150 in the present disclosure refers to an angle between a reference line "L" perpendicular to the flow direction of the exhaust gas and an injection direction of the injector 150. That is, the smaller the injection angle "α" of the injector 150 is, the more perpendicular to the flow direction of the exhaust gas the urea solution will be injected. In addition, the greater the injection angle "α" of the injector 150 is, the more parallel to the flow direction of the exhaust gas the urea solution will be injected.

Since the degree to which the urea solution diffuses into the exhaust gas within the same distance can be reduced as the spatial velocity of the exhaust gas is increased, the control unit 350 controls the driving unit 250 so as to decrease the injection angle "α" of the injector 150 such that the urea solution is injected in a direction close to the radial direction of the exhaust pipe 20 and hence it is diffused into the exhaust gas more rapidly, thereby enhancing performance of mixing the urea solution and the exhaust gas.

On the contrary, if the spatial velocity of the exhaust gas is reduced, influence of the exhaust gas flow on the flow of the urea solution is reduced and hence there may be a situation that the urea solution moves across the exhaust gas flow and adheres to an inner wall of the exhaust pipe 20 at the opposite side of the injector 150.

If the urea solution adheres to the inner wall of the exhaust pipe 20, it cannot contribute to chemical reaction with NOx substance in the exhaust gas, and eventually efficiency of removing the NOx substance is reduced. Therefore, the control unit 350 increases the injection angle "α" of the injector 150 to allow the urea solution to be injected in a direction close to the flowing direction of the exhaust gas such that the urea solution does not move across the exhaust gas flow and hence it diffuses into the exhaust gas without adhering to the inner wall of the exhaust pipe 20, thereby enhancing performance of mixing the exhaust gas and the urea solution.

On the other hand, as described above, the spatial velocity of the exhaust gas, which can be calculated by taking flow rate, pressure and temperature of the exhaust gas as parameters, increases in proportion to values of at least one of the flow rate, pressure and temperature of the exhaust gas.

Accordingly, the present disclosure is implemented such that an injection angle "α" of the injector 150 can be determined based on the flow rate, temperature or pressure of the exhaust gas, which are in a proportional relationship with the spatial velocity, as well as the spatial velocity of the exhaust gas.

Specific determination relationship between the values of the at least one of the spatial velocity, flow rate, pressure and temperature of the exhaust gas and the injection angle "α" of the injector 150 may be determined experimentally or theoretically and it may be adjusted by environmental or structural characteristics of the exhaust purification apparatus.

As discussed with reference to this form, the present disclosure controls the injection angle α for injecting the urea solution so as to improve performance of mixing the urea solution and the exhaust gas even under the situation that the spatial velocity of the exhaust gas between the injector 150 and the catalyst device varies, and eventually improves efficiency of removing NOx substance in the exhaust gas.

On the other hand, as shown in FIGS. 2 and 3, the exhaust purification apparatus for a vehicle according to one form of the present disclosure may further comprises a sealing member 200 arranged at a mounting portion for the injector 150, at which the injector 150 is mounted on the exhaust pipe 20. The sealing member 200 is deformed by the pivotal movement of the injector 150 such that it seals the mounting portion while allowing the pivotal movement of the injector 150.

In one form, the injector 150 may be arranged at a point of the exhaust pipe 20 in which exhaust gas flows, and in another form, the injector 150 may be arranged to penetrate through a point of the exhaust pipe 20. Accordingly, there may be a situation where the exhaust gas leaks out to the outside of the exhaust pipe 20.

In particular, as the injector 150 is arranged to move pivotally, a gap may be inevitably formed in the mounting portion for the injector 150 (i.e., at a portion of the exhaust pipe 20 to which the injector 150 penetrates). Accordingly, it is likely to cause the exhaust gas and the like flowing in the exhaust pipe 20 to leak out to the outside of the exhaust pipe 20 through the gap at the mounting portion for the injector 150.

To avoid this, the present disclosure is provided with a sealing member 200 which is arranged at the mounting portion for the injector 150 and is deformable by the pivotal movement of the injector 150. In the present disclosure, the injector 150 is mounted to move pivotally such that the injection angle "α" of the injector 150 varies depending on the spatial velocity of the exhaust gas wherein in order to facilitate pivotal movement of the injector 150, the sealing member 200 is adapted to be easily deformed by the pivotal movement of the injector 150.

The sealing member 200 may be made of a variety of flexible materials such as rubber, silicone and the like. Further, the sealing member is arranged around the mounting portion for the injector 150 so as to inhibit or prevent any leakage of the exhaust gas through a gap between the injector 150 and the exhaust pipe 20. FIGS. 2 and 3 schematically illustrates a configuration that such sealing member 200 is arranged.

In another form, the sealing member 200 may be arranged to enclose the mounting portion for the injector 150 and at least partially the injector 150, as shown in FIGS. 2 and 3.

Unlike the common urea solution injector, the injector 150 of the present disclosure is arranged to facilitate pivotal movement. Therefore, the sealing member 200 of the present disclosure is desired to have ductility greater than that of the sealing member sealing the mounting portion for the common injector, and to reliably inhibit or prevent leakage of the exhaust gas and the like.

Accordingly, the sealing member 200 may be made of sealing material of high ductility having a cylindrical shape and may be adapted to enclose the mounting portion for the injector 150 as well as a portion of the injector 150, so that it can effectively inhibit or prevent leakage of the exhaust gas and the like. FIG. 3 schematically illustrates the sealing member 200 adapted to enclose the lower portion of the injector 150 along with the mounting portion for the injector 150.

According to one form of the present disclosure, the control unit 350 may determine the injection angle "α" of the injector 150, taking an injection amount of the urea solution from the injector 150 and values of at least one of the spatial velocity, flow rate, pressure and temperature of the exhaust gas as parameters.

Specifically, performance of mixing the urea solution and the exhaust gas may depend on the spatial velocity (alternatively, flow rate, pressure, or temperature) of the exhaust gas, but vary depending on an injection amount of the urea solution as well. Therefore, the control unit 350 of the present disclosure determines the injection angle "α" of the injector 150 based on the spatial velocity of the exhaust gas as well as the injection amount of the urea solution from the injector 150.

As one example, if the injection amount of the urea solution is large, it is likely to cause the urea solution to adhere to the inner wall of the exhaust pipe 20 even under the same spatial velocity of the exhaust gas and hence the injection angle "α" of the injector 150 is forced to decrease. On the contrary, if the injection amount of the urea solution is small, it is likely to cause the diffusing degree of the urea solution into the exhaust gas to decrease even under the same spatial velocity of the exhaust gas and hence the injection angle "α" of the injector 150 is forced to increase.

That is, in one form, both the values of the at least one of the spatial velocity, flow rate, pressure and temperature of the exhaust gas and the injection amount of the urea solution are considered as parameters for determining the injection angle "α" of the injector 150 and thus, it is possible to determine the injection angle "α" of the injector 150 that can improve the performance of mixing the exhaust gas and the urea solution.

In another form, the control unit 350 may be arranged to determine the injection angle "α" of the injector 150, which matches with the current spatial velocity of the exhaust gas, through a data map in which values of at least one of spatial velocity, flow rate, pressure and temperature of the exhaust gas are binned and an injection angle "α" of the injector 150 for each of bins is predetermined and stored.

Specifically, the control unit 350 can calculate the values of the at least one of the spatial velocity, flow rate, pressure and temperature of the exhaust gas in real time and also determine a suitable injection angle "α" of the injector 150 in real time based on relationship derived experimentally or theoretically. However, such calculation process may cause a time delay and increase processing burden for such calculation.

Therefore, in this form of the present disclosure, the control unit 350 is adapted to determine the injection angle "α" of the injector 150, using a data map in which injection angles "α" of the injector 150 depending on the values of the at least one of the spatial velocity, flow rate, pressure and temperature of the exhaust gas are predetermined on the basis of the above process.

In particular, since the data map is constituted by binning values of at least one of spatial velocity, flow rate, pressure and temperature (particularly, spatial velocity) of the exhaust gas and allows the injection angle "α" of the injector 150 to be determined for each of bins, determining the injection angle "α" of the injector 150 using the data map is easy compared to a real time calculation method.

It is appreciated that bins of the values of the at least one of the spatial velocity, flow rate, pressure and temperature of the exhaust gas may be defined variously in the data map, as desired.

On the other hand, the control unit 350 may control the injection angle "α" of the injector 150 such that the injection angle "α" of the injector 150 decreases as the values of the at least one of the spatial velocity, flow rate, pressure and temperature of the exhaust gas increase.

As discussed above, if the spatial velocity of the exhaust gas is increased under the same injection angle "α" of the injector 150, the exhaust gas reaches the catalyst device before the urea solution diffuses throughout the entire exhaust gas, with the result that the amount of chemical reaction for removing NOx substance is possibly reduced and thereby efficiency of removing NOx substance is reduced.

On the contrary, if the spatial velocity of the exhaust gas is decreased under the same injection angle "α" of the injector 150, the urea solution flow moves across the exhaust gas and adheres to the inner wall of the exhaust pipe 20 opposite to the injector 150, with the result that the urea solution cannot contribute to chemical reaction with NOx substance and thereby efficiency of removing NOx substance is reduced.

Therefore, if the spatial velocity of the exhaust gas is increased, the injection angle "α" of the injector 150 is forced to decrease so as to allow the urea solution to flow in a direction close to a radial direction of the exhaust pipe 20, so that the urea solution diffuses uniformly throughout the entire exhaust gas in spite of influence of movement of the exhaust gas from one side one side of the exhaust pipe 20.

On the contrary, if the spatial velocity of the exhaust gas is decreased, the injection angle "α" of the injector 150 is forced to increase so as to allow the urea solution to flow in a direction close to the direction of the exhaust gas flow, so that the urea solution is inhibited or prevented from moving across the exhaust gas and adhering to the inner wall of the exhaust pipe 20.

After all, an appropriate injection angle α of the injector 150 that allows the urea solution to diffuse uniformly in the exhaust gas is determined depending on the spatial velocity of the exhaust gas, so that the performance of mixing the exhaust gas and the urea solution and the efficiency of removing NOx substance in the exhaust gas are enhanced.

Even in the case of using values of at least one of the flow rate, pressure and temperature of the exhaust gas, which are in a proportional relationship with the spatial velocity, the same explanation as the above description that is made with reference to the spatial velocity can be applied thereto.

On the other hand, as shown in FIG. 3, the exhaust purification apparatus for a vehicle further comprises a link member 300 for transmitting driving force of the driving unit 250 to the injector 150.

Specifically, the link member 300 is to couple the driving unit 250 and the injector 150 and may be provided in various shapes such as linear shaped link, curved link, bent shaped link and the like.

The driving unit 250 is arranged to provide driving force for rotating the injector 150 pivotally. However, arranging the driving unit 250 so as to be directly coupled to the injector 150 may be inadequate in terms of the available space of the exhaust pipe 20 side in which the exhaust purification apparatus is installed.

In particular, there are many cases where a variety of devices in addition to the exhaust purification apparatus are installed in a flow passage through which the exhaust gas of the vehicle flows. Therefore, it is important to suitably utilize the space in which the exhaust pipe 20 is located.

That is, in this form of the present disclosure, the link member 300 for coupling the driving unit 250 and the injector 150 is utilized, so that it is possible to enhance the degree of freedom of the space utilization in installing the exhaust purification apparatus and it will facilitate to determine layout design of vehicles. FIG. 3 illustrates a status that driving force of the driving unit 250 arranged to be spaced apart from the injector 150 via the link member 300 is transmitted to the injector 150.

In another form, the driving unit 250 is provided with a rotary arm 260 forming rotational displacement while the rotary arm 260 is arranged to be coupled to the link member 300 to transmit driving force, as shown in FIG. 3.

The driving unit 250 may be arranged to provide various kinds of driving forces wherein due to the nature of the present disclosure, when the injector 150 moves pivotally, a distance between a point of the injector 150, to which the driving unit 250 or the link member 300 is coupled and the driving force is transmitted, and the driving unit 250 will vary.

Accordingly, it is desired that a structure for transmitting the driving force to the injector 150 through the driving unit 250 or the link member 300 can also vary the distance transmitting the driving force. In this form, the distance transmitting the driving force can be varied by means of a structure comprising the rotary arm 260 formed in the driving unit 250 and the link member 300.

This process will be further described below with reference to FIG. 3.

First, the driving unit 250 is arranged as a means for providing rotational force, such as a motor. A power shaft 255 of the driving unit 250 is provided with the rotary arm 260, so that the rotary arm 260 forms a rotational displacement by the power of the driving unit 250.

As illustrated in FIG. 3, one side 265 of the link member 300 is coupled with the rotary arm 260 of the driving unit 250 and other side 305 is coupled with the injector 150 while each of coupling points is hinged to facilitate rotation. That is, the link member 300 is constituted such that an angle formed between the link member 300 and the rotary arm 260 and also an angle formed between the link member 300 and the injector 150 can vary depending on the driving state of the driving unit 250.

With this structure, the distance between the power shaft 255 of the driving part 250 and the other side 305 of the link member 300 (i.e., a point where the link member 300 is coupled with the injector 150, and the driving force or displacement is transmitted to the injector 150) is variable, and it is possible to transmit the driving force or displacement from the driving unit 250 to the injector 150 while providing the variable distances between the injector 150 and the driving unit 250, which are generated by pivotal movement of the injector 150 by virtue of this structure.

That is, with the structure as described above, it is possible to transmit the driving force of the driving unit 250 to the injector 150 while a distance transmitting the driving force is varied by means of position of the driving unit 250 provided to be spaced apart from the injector 150 in consideration of the aspect of space utilization and the characteristics of the injector 150.

Referring to FIG. 3, the exhaust purification apparatus further comprises guide members 320 and 325 arranged in a shape of protrusion to limit the range of the pivotal movement of the injector 150.

The injector 150 is provided to adjust the injection angle "α" of the urea solution in a manner of moving pivotally. If the pivotal movement of the injector 150 is out of the normal range or excessive driving force is exerted thereon due to an extraordinary operation, it is likely to cause the coupling point of the injector 150, the exhaust pipe 20, or the link member 300, etc. to be deformed or broken down.

In order to inhibit or prevent such situation, the present disclosure is provided with guide members 320 and 325 to limit the range of a pivoting angle of the injector 150. The number or the position of the guide members 320 and 325 may vary as desired. For example, a plurality of guide members may be installed along the direction of pivotal movement of the injector 150, or a guide member may be provided only at one side of the direction of pivotal movement of the injector 150 if desired. Further, the guide members 320 and 325 may be provided integrally with the exhaust pipe 20, or may be provided separately and then combined with the exhaust pipe.

FIG. 3 illustrates a configuration that the guide member 320 for limiting the maximum level of the injection angle "α" of the injector 150 and the guide member 325 for limiting the minimum level of the injection angle of the injector are provided. It is appreciated that such maximum and minimum levels of the injection angle "α" of the injector 150 may be determined variously in consideration of design factors.

Figure 4:
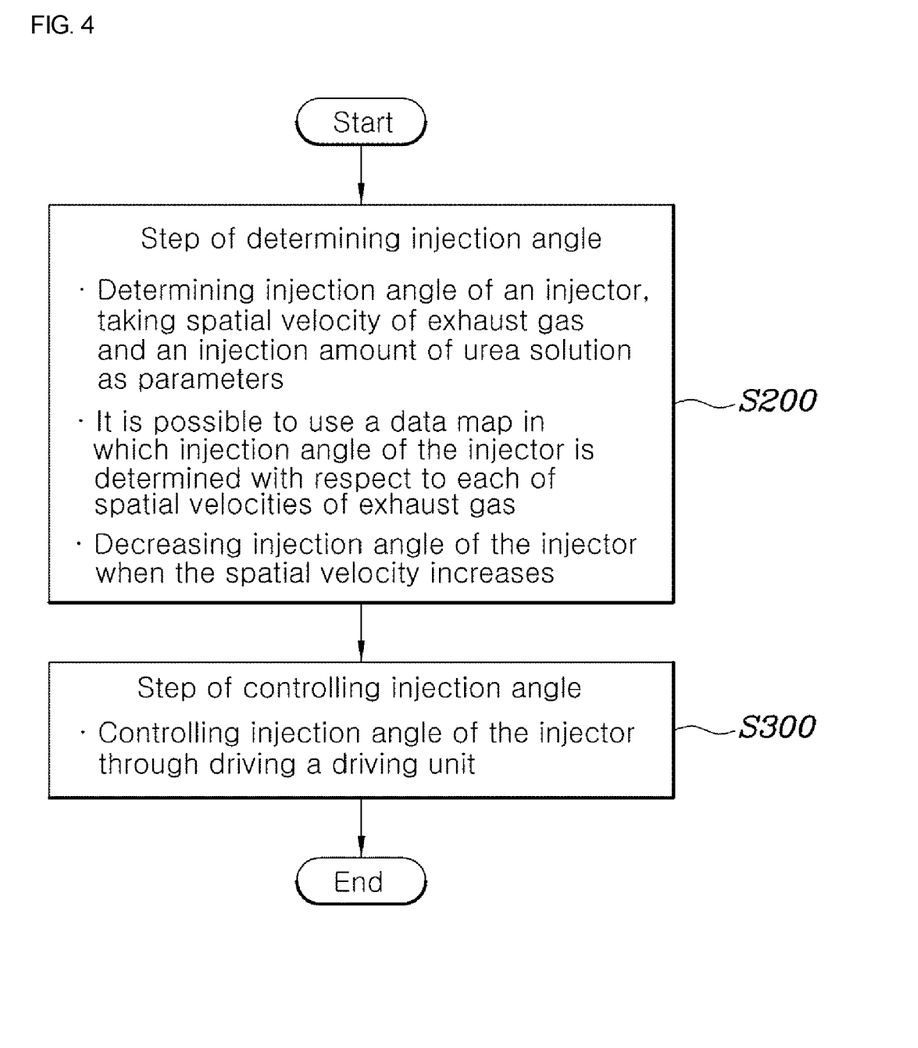
FIG. 4 is a flowchart explaining a method of controlling an exhaust purification apparatus for a vehicle.

As shown in FIG. 4, a method of controlling an exhaust purification apparatus for a vehicle comprises: a step of determining an injection angle S200 at which a control unit 350 determines the injection angle "α" of an injector 150 for injecting urea solution into an exhaust pipe 20, based on values of at least one of spatial velocity, flow rate, pressure and temperature of exhaust gas; and a step of controlling the injection angle of the injector S300 at which the control unit 350 drives a driving unit 250 and controls the injection angle "α" of the injector 150 such that the injection angle "α" of the injector 150 satisfies the injection angle "α" determined at the step of determining the injection angle S200.

Specifically, at the step of determining the injection angle S200, the control unit 350 determines the injection angle "α" of the injector 150 for injecting the urea solution to the inside of the exhaust pipe 20, based on the values of the at least one of the spatial velocity, flow rate, pressure and temperature of the exhaust gas.

As discussed previously, if the spatial velocity and the like of the exhaust gas vary under the same injection angle "α" of the injector 150, performance of mixing the urea solution and the exhaust gas varies and hence efficiency of removing NOx substance cannot be always kept at maximum. Therefore, the injection angle "α" of the injector 150 for injecting the urea solution is determined depending on the values of the at least one of the spatial velocity of the exhaust gas and the flow rate, pressure and temperature of the exhaust gas, which are in a proportional relationship with the spatial velocity.

At the step of controlling the injection angle S300, the control unit 350 drives the driving unit 250 and controls the injection angle "α" of the injector 150 such that the injection angle "α" of the injector 150 can be adjusted to the injection angle "α" determined at the step of determining the injection angle S200.

As discussed previously, the injector 150 for injecting the urea solution is provided to move pivotally while the control unit 350 is adapted to drive the driving unit 250 and control the injector 150 to be positioned at the injection angle "α" determined at the step of determining the injection angle S200.

In another form, the control unit 350 may determine, at the step of determining the injection angle S200, the injection angle "α" of the injector 150, taking a urea solution injection amount of the injector 150 and the values of the at least one of the spatial velocity, flow rate, pressure and temperature of the exhaust gas as parameters, as shown in FIG. 4.

Since the performance of mixing the exhaust gas and the urea solution varies depending on the injection amount of the urea solution as well as the spatial velocity, flow rate, pressure and temperature of the exhaust gas, it is possible to determine the injection angle "α" of the injector 150 based on the injection amount of the urea solution and the values of the at least one of the spatial speed, flow rate, pressure and temperature of the exhaust gas.

The control unit 350, in another form, may determine, at the step of determining the injection angle S200, the injection angle "α" of the injector 150 for the current spatial velocity of the exhaust gas through a data map in which values of at least one of spatial velocity, flow rate, pressure and temperature of the exhaust gas are binned and an injection angle "α" of the injector 150 for each of bins is predetermined and stored, as shown in FIG. 4.

That is, instead of calculating the injection angle "α" of the injector 150 in real time, the control unit 350 may determine the injection angle "α" of the injector 150 that is now desired, using a data map in which values of at least one of spatial velocity, flow rate, pressure and temperature of the exhaust gas are binned and an injection angle "α" is set for each of bins.

In still another form, the control unit 350 may control the injection angle "α" of the injector 150 at the step of determining the injection angle S200 such that the injection angle "α" of the injector 150 decreases as the values of the at least one of the spatial velocity, flow rate, pressure and temperature of the exhaust gas increase, as shown in FIG. 4.

In other words, if the spatial velocity of the exhaust gas is increased, distance desired to diffuse the urea solution throughout the entire exhaust gas may be increased. In order to inhibit or prevent this, the injection angle "α" of the injector 150 is forced to decrease so as to allow the urea solution to be injected in a direction close to the radial direction of exhaust pipe 20, thereby enhancing the performance of mixing the urea solution and the exhaust gas.

On the contrary, if the spatial velocity of the exhaust gas is decreased, there may be a situation that the urea solution flow moves across the exhaust gas and adheres to the exhaust pipe 20. Therefore, the control unit 350 increases the injection angle "α" of the injector 150 so as to allow the urea solution to be injected in a direction close to the flowing direction of the exhaust gas such that the urea solution is inhibited or prevented from adhering to the exhaust pipe, thereby enhancing performance of mixing the exhaust gas and the urea solution.

Further, even in the case of using values of at least one of the flow rate, pressure and temperature of the exhaust gas, which are in a proportional relationship with the spatial velocity, the same explanation as the above description that is made with reference to the spatial velocity can be applied thereto.

Although the present disclosure has been described and illustrated with respect to specific forms, it will be apparent by those who have ordinary skill in the art that various modifications and changes to the present disclosure may be made without departing from the spirit and scope of the present disclosure.

What is claimed is:

1. An exhaust purification apparatus for a vehicle, comprising:
    an injector configured to inject urea solution into an exhaust pipe, an injection angle of the injector adjusted by pivotal movement of the injector;
    a driving unit configured to provide driving force for adjusting the injection angle of the injector; and
    a control unit configured to determine the injection angle of the injector based on values of at least one of spatial velocity, flow rate, pressure and temperature of exhaust gas and configured to drive the driving unit so as to control the injection angle of the injector,
    wherein the control unit determines the injection angle of the injector based on an injection amount of the urea solution from the injector and values of at least one of a spatial velocity, flow rate, pressure and temperature of the exhaust gas as parameters.

2. The exhaust purification apparatus of claim 1, further comprising a sealing member arranged at a mounting portion for the injector in the exhaust pipe and configured to be deformed by the pivotal movement of the injector so as to seal the mounting portion while allowing the pivotal movement of the injector.

3. The exhaust purification apparatus of claim 2, wherein the sealing member is arranged to enclose the mounting portion and at least partially the injector.

4. The exhaust purification apparatus of claim 1, wherein the control unit is configured to determine the injection angle of the injector matching with a current spatial velocity of the exhaust gas through a data map in which values of at least one of spatial velocity, flow rate, pressure and temperature of the exhaust gas are binned and the injection angle of the injector for each of bins is predetermined and stored.

5. The exhaust purification apparatus of claim 1, wherein the control unit determines the injection angle of the injector such that the injection angle of the injector decreases as the values of the at least one of the spatial velocity, flow rate, pressure and temperature of the exhaust gas increase.

6. The exhaust purification apparatus of claim 1, further comprising a link member configured to transmit driving force of the driving unit to the injector.

7. The exhaust purification apparatus of claim 6, wherein the driving unit is provided with a rotary arm configured to perform a rotational displacement, the rotary arm coupled to the link member to transmit the driving force.

8. The exhaust purification apparatus of claim 1, further comprising guide members in a shape of protrusion formed to limit a range of the pivotal movement of the injector.

9. A method of controlling an exhaust purification apparatus for a vehicle, the method comprising:
    a step of determining, by a control unit, an injection angle of an injector for injecting urea solution into an exhaust pipe, based on at least one of a spatial velocity, flow rate, pressure and temperature of exhaust gas; and
    a step of controlling, by the control unit, the injection angle of the injector, the control unit configured to drive a driving unit such that the injection angle of the injector is adjusted to an injection angle determined at the step of determining the injection angle,
    wherein at the step of determining the injection angle, the control unit determines the injection angle of the injector based on an urea solution injection amount of the injector and values of the at least one of the spatial velocity, flow rate, pressure and temperature of the exhaust gas as parameters.

10. The method of claim 9, wherein at the step of determining the injection angle, the control unit determines the injection angle of the injector for a current spatial velocity of the exhaust gas through a data map in which values of at least one of spatial velocity, flow rate, pressure and temperature of the exhaust gas are binned and an injection angle of the injector for each of bins is predetermined and stored.

11. The method of claim 9, wherein at the step of determining the injection angle, the control unit controls the injector so as to decrease the injection angle of the injector as values of the at least of the spatial velocity, flow rate, pressure and temperature of the exhaust gas increase.

* * * * *